United States Patent [19]
Weisser, Jr. et al.

[11] Patent Number: 5,600,710
[45] Date of Patent: Feb. 4, 1997

[54] METHOD FOR PROVIDING A RECORDED MESSAGE TO A TELEPHONE CALLER WHEN CALLED NUMBER IS BUSY

[75] Inventors: Frank J. Weisser, Jr., Atlanta, Ga.; Jimmy W. Langley, Birmingham, Ala.

[73] Assignee: BellSouth Corporation, Atlanta, Ga.

[21] Appl. No.: 543,513

[22] Filed: Oct. 16, 1995

Related U.S. Application Data

[63] Continuation of Ser. No. 272,130, Jul. 8, 1994, abandoned.

[51] Int. Cl.[6] .................. H04M 1/64; H04M 7/00
[52] U.S. Cl. .................. 379/67; 379/210; 379/214; 379/266; 379/265
[58] Field of Search .................. 379/265, 266, 379/229, 220, 221, 207, 216, 67, 68, 89, 201, 209, 214, 84, 210, 309

[56] References Cited

U.S. PATENT DOCUMENTS

| | | | |
|---|---|---|---|
| Re. 34,380 | 9/1993 | Sleevi | 379/67 |
| 4,510,349 | 4/1985 | Segre-Amar | 379/67 |
| 4,922,490 | 5/1990 | Blakley | 379/88 |
| 4,941,167 | 7/1990 | Cannalte et al. | 379/67 |
| 4,953,204 | 8/1990 | Cuschleg, Jr. et al. | 379/266 |
| 5,150,399 | 9/1992 | Yasuda | 379/201 |
| 5,212,727 | 5/1993 | Ramkumar | 379/266 |
| 5,276,731 | 1/1994 | Arbel et al. | 379/88 |
| 5,278,898 | 1/1994 | Cambray et al. | 379/266 |
| 5,309,505 | 5/1994 | Szlam et al. | 379/265 |
| 5,321,740 | 6/1994 | Gregorek et al. | 379/67 |
| 5,444,774 | 8/1995 | Frieds | 379/266 |
| 5,448,633 | 9/1995 | Jamaleddin et al. | 379/201 |
| 5,452,350 | 9/1995 | Reynolds et al. | 379/220 |

OTHER PUBLICATIONS

Andrew Waite, "Beyond ISDN Theory", Dec. 1989, pp. 20–24.

*Primary Examiner*—Ahmad F. Matar
*Assistant Examiner*—T. Devendra Kumar
*Attorney, Agent, or Firm*—Jones & Askew

[57] ABSTRACT

A method of playing a recorded message to a caller when a called line is busy without actual connection of the call is disclosed. Utilization of the Advanced Intelligent Network is used to place calls attempting to reach a busy line into a queue in a service control point. The call is then connected to an intelligent peripheral, such as a service node, and plays a recorded message of the called party's choice. When the called party's line become idle, a call chosen from the established queue is then connected to it based upon a prioritization system established by the called party.

8 Claims, 6 Drawing Sheets

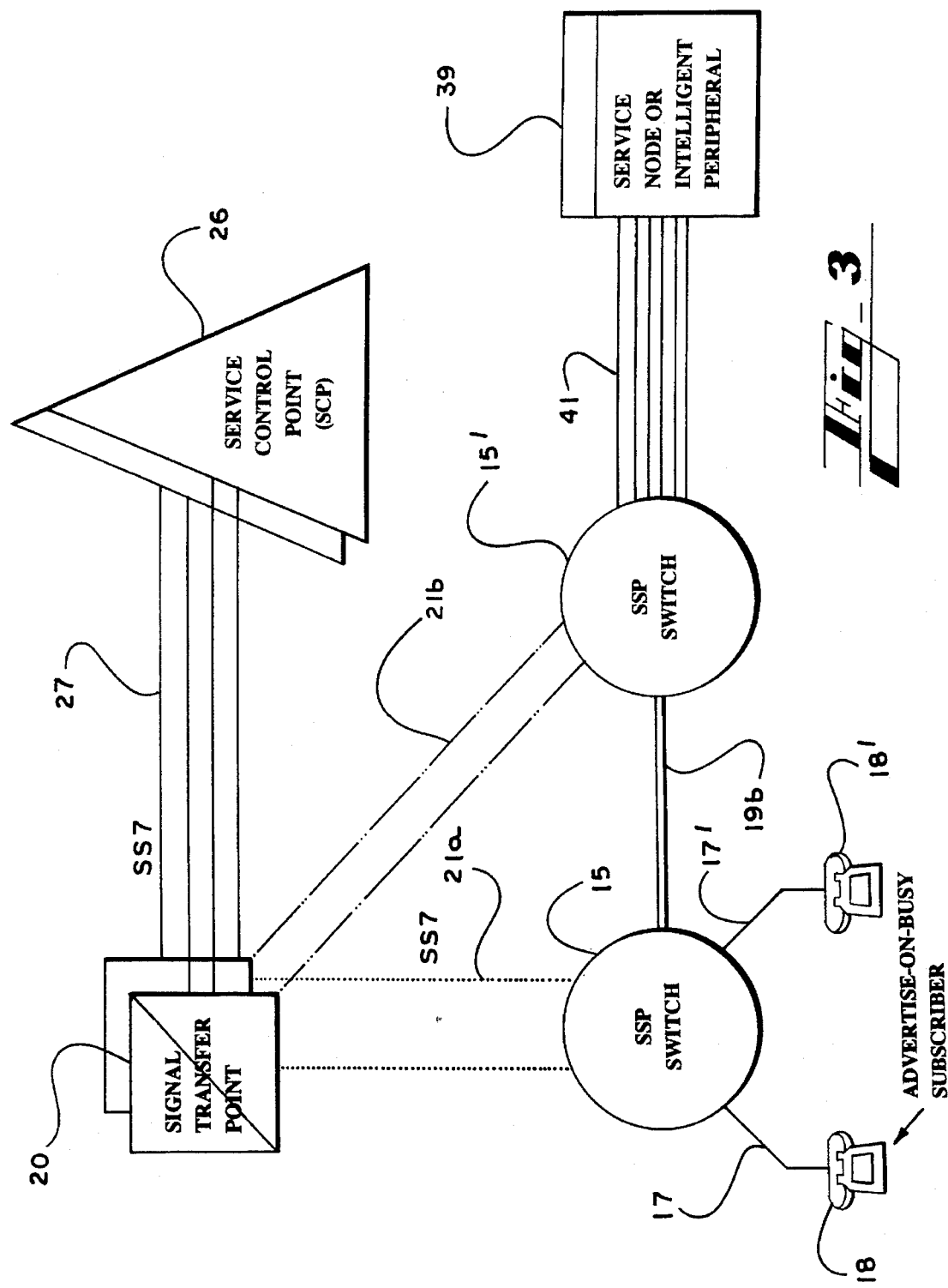

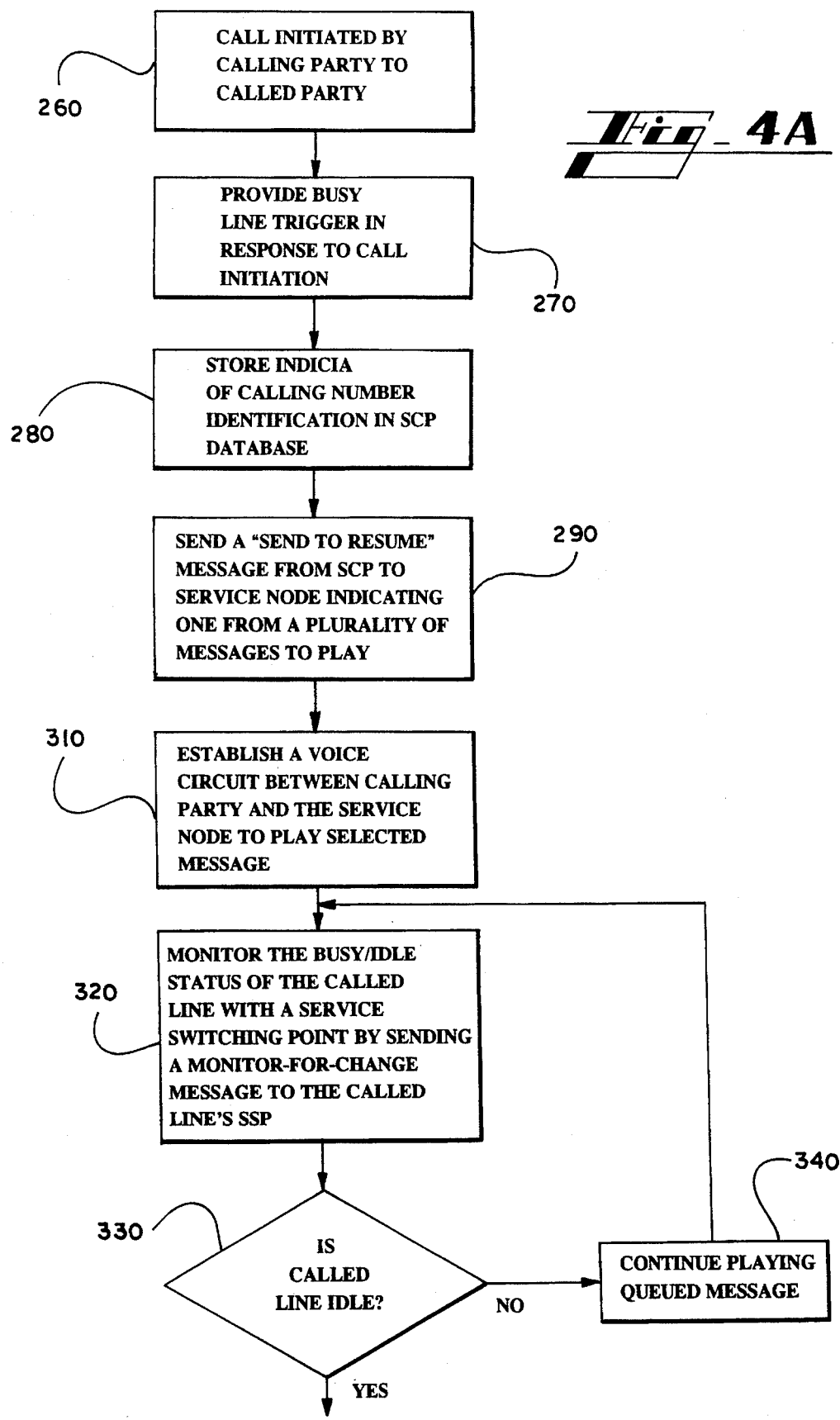

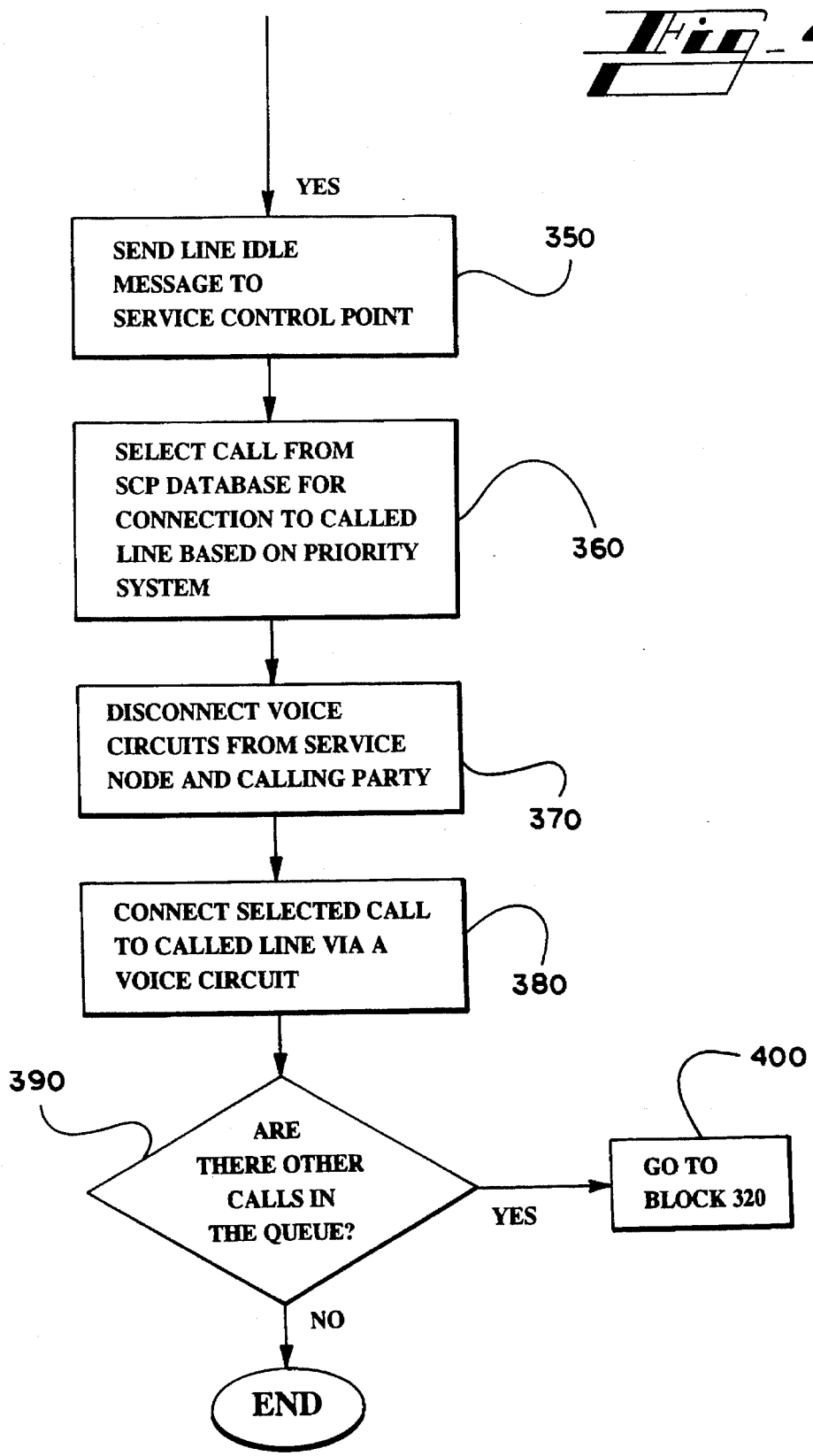

METHOD FOR PROVIDING A RECORDED MESSAGE TO A TELEPHONE CALLER WHEN CALLED NUMBER IS BUSY

This is a continuation of application Ser. No. 08/272,130, filed Jul. 8, 1994, now abandoned.

TECHNICAL FIELD

The present invention generally relates to the field of switched telephony and in particular is a method of placing calls on hold when a called line is busy, playing a recorded message to calls placed on hold and connecting the call when the called line becomes idle based upon a priority system established by the called party.

BACKGROUND OF THE INVENTION

Many special telephone services have been made available to subscribers in recent years. Most of these services, such as call waiting and caller identification, are designed to operate within the telephone network as originally designed by American Telephone and Telegraph Company (AT&T) and further developed by the Regional Bell Operating Companies (RBOC) and other telephone service providers. The specific networks currently used by the RBOCs are, in relevant part, identical throughout the United States and most of the developed industrialized world including Western Europe and Japan.

The fundamental architecture of Public Switched Telephone Networks (PSTNs) in the industrialized western world is that separate signaling paths are provided for the voice (or other customer utilized communication circuits) and for information transmitted throughout the network that controls the connection and disconnection of the voice circuits. This is to be contrasted with earlier versions of Public Switched Telephone Networks in which tone signals were transmitted over the same circuits used as voice paths to control set-up and takedown of calls, creation of billing records, and the like.

The current implementation of the control network used in the United States is referred to as the Signaling System 7 (SS7) network. The Advanced Intelligent Network (AIN) is a standard call control protocol which uses the SS7 network for message transport.

The present invention works within the AIN to deliver a special feature not previously disclosed in the art. Therefore, it is advantageous to briefly describe the AIN and its architecture in order to have a complete understanding of the objects and advantages of the present invention. The general architecture of the AIN is relatively simple and is shown in FIG. 1.

FIG. 1 of the specification is a block diagram representing at least part of the AIN of a typical local exchange carrier. While the diagram is simple, the components therein are well known to those skilled in the art. The majority of intelligence in the intelligent switched network resides in computers and switches that embody the AIN, and make use of the SS7 message transport network. SS7 is a network architecture in which information about a telephone call is transmitted over high speed data links that are separate from the voice circuits used to complete the call itself. Using SS7, it is determined whether it is possible to complete a call prior to assigning trunk capacity to set up the voice link. A plurality of central office switches are provided in a typical portion of the public switch telephone network. These are indicated as service switching point (SSP) switches 15–15' in FIG. 1. The dash line between these indicate that the number is arbitrary. Also, non-SSP switches, such as switch 16, are also included within the network.

The difference between an SSP central office switch and a non-SSP central office switch is that the former includes intelligent network functionality. This is an indication that the switch is equipped with appropriate hardware and software so that, when a set of predetermined conditions is detected, the switch will initiate a trigger for a predetermined state of a call on a subscriber line, generate the trigger as an appropriate message to be sent over the AIN, and suspend handling of a call until it receives a reply from the network instructing it to take certain action. In the alternative, the switch will have a default task to execute if a time-out occurs and no response is provided by the network to the query made by the switch. In summary, the SSP switches are those that are fully equipped to deal with and to take advantage of the AIN described herein.

Non-SSP switch 16 is an electronic switch that can generate certain rudimentary packets and provide them over the network, but which must rely on other equipment to provide subscriber lines connected to such a switch with more complex features and services available in the intelligent network. Central offices 15–15' and 16 each have a plurality of subscriber lines commonly designated as 17–17', connected thereto. Typically, the number of subscriber lines will be on the order of 10,000 to 70,000 lines. Each subscriber line 17–17' is connected to a terminating piece of customer's premise equipment that is represented by a like plurality of telephone sets 18–18' for each of the switches.

Interconnecting central office switches 15 and 16 are a plurality of trunk circuits indicated as 19 in FIG. 1. These are the voice path trunks that interconnect the central office and over which calls are connected when established. It should be understood that central office trunking in a typical urban environment is not limited to a daisy chain arrangement implied by FIG. 1. In other words, in a typical network, trunk circuits will exist between central office switch 15' and central office switch 16. Therefore, when a local call is made between two central offices, if a direct trunk connection exists between the offices, and is not busy, the network will assign that trunk to the completion of that particular call. If there is no direct trunking between the two central offices or the direct trunks are all in use, the last call will be routed along trunks from the originating central office to at least one other central office, and through subsequent trunk connections on to the terminating central office.

This general architecture is magnified when a wider geographic area that includes multiple local exchange carriers is considered. In that case, the only significant difference is that certain inter-exchange carrier switches that switch nothing but long distance trunk circuits are included.

Most of the intelligence of the intelligent switched telephone network resides in the remaining components shown on FIG. 1. These are the computers and switches that embody the current version of the common channel inter-office signaling scheme (SS7) mentioned above. Each of switches 15 through 16 is connected to a local signal transfer point (STP) 20 via respective data links 21a, 21b, and 21c. Currently, these data links are 56 kilobit per second bi-directional data links employing a signal protocol referred to as Signaling System 7 (SS7). The SS7 is well known to those skilled in the art and is described in a specification promulgated by the American National Standards Institute (ANSI). The SS7 protocol is a layered protocol wherein each layer provides services for layers above it and relies on the layers below to provide it with services. The protocol employs packets that include the usual beginning and terminating flags and a check bit. Additionally, a signal information field is provided that includes a variable length user specific data field and a routing label. A service information octet is provided that identifies a priority of the message, the national network of the destination of the message, and the user name identifying the entity that created the message. Also, certain control and o sequence numbers are included within the packet, the uses and designations of which are known to those skilled in the art and described in the above-referenced ANSI specification.

All of the SS7 data packets from the switches go to a signal transfer point (STP) 20. Those skilled in the art will recognize that signal transfer point 20 is simply a multi-port, high speed packet switch that is programmed to respond to the routing information in the appropriate layer of the SS7 protocol, and route the packet to its intended destination. The signal transfer point is not normally, per se, the destination of a packet, but merely directs traffic among the other entities on the network that generate and respond to the data packets. It should be noted that signal transfer point devices such as STP 20 are conventionally installed in redundant pairs within a network so that if one device fails, its mate takes over until the first STP is able to return to service. In practice, there are redundant data links between each of central office switches 15–16 for enhanced reliability. For the sake of simplicity of the drawings, the redundant devices have not been illustrated in the drawing figures and the specifications.

Also connected to signal transfer point 20 over SS7 data link 25 is a 1AESS network access point (NAP) 22. Network access point 22 is a computing device programmed to detect trigger conditions. It requires the support of an SSP switch to notify AIN network systems of these trigger detection events. An SSP can support multiple NAP switches. Logically, this SSP is designated as the destination address for many of the packets generated by the network that would otherwise be routed to the 1AESS NAP if it were an SSP equipped switch.

Much of the intelligence, and the basis for many of the new enhanced features of the network reside in the local service control point (SCP) 26 that is connected to signal transfer point 20 via SS7 data link 27. As is known to those skilled in the art, service control points are physically implemented by relatively powerful fault tolerant computers. Typical implementation devices include the Star Service FT Model 3200 or the Star Service FT Model 3300, both sold by American Telephone & Telegraph Company. The architectures of these computers are based on Tandem Integrity S2 and Integrity S1 platforms, respectively. In most implementations of a public switched telephone network, service control points are also provided in redundant mated pairs in order to assure reliability and continued operation of the network.

The computing devices implementing service control points typically accommodate 1 to 27 disk drives ranging from 300 megabytes to 1.2 gigabytes per drive, and have main memory on the order of 24 to 192 megabytes. Thus, it will be appreciated that these are large and powerful computing machines. Among the functions performed by the service control points is maintenance of network data bases used in providing enhanced services. The computer embodying the SCPs can execute at a speed on the order of 17,000,000 instructions per second. Using the SS7 protocol, this translates to about 50–100 transactions (query/response pairs) of network messages per second.

Service control point computers were initially introduced into the network to handle the necessary translations and billing transactions for the implementation of 800 phone service. An 800 number subscriber has at least one dial-up number that is to be called when a call to that subscriber's 800 number is placed. There is no physical central office or area of the country that corresponds to the 800 area code. It is significantly more economical to provide a few central locations at which the look up of the directory number for an 800 number call can be made than to provide the translation information o redundantly at many central office switches. Currently, service control points also include data bases for credit card call transactions.

Also, service control points include data bases that identify particular service customers. In order to keep the processing of data and calls as simple and generic as possible at switches, such as switches 15–15', a relatively small set of triggers are defined at the switches for each call. A trigger in the network is an event associated with a particular subscriber line or call that generates a packet to be sent to a service control point. The trigger causes the service control point to query its data base to determine whether some customized calling feature or enhanced service should be implemented for this particular call, or whether conventional plain dialed-up telephone service should be provided for the call. The results of the data base inquiry are sent back to the switch from SCP 26 through STP 20. The return packet includes instructions to the switch as to how to process the call. The instruction may be to take some special action as a result of a customized calling service or enhanced feature, or may simply be an indication that there is no entry in this data base that indicates that anything other than plain telephone service should be provided for the particular call. In response to receiving the later type message, the switch will move through its call states, select the call digits, and may generate further packets that will be used to set up and route the call, as described hereinabove.

Similar devices for routing calls among various local exchange carriers are provided by regional signal transfer point 28 and regional service control point 29. The regional STP 28 is connected to local STP 20 via an SS7 data link 30. The regional STP 28 is connected to the regional SCP 29 via data link 31 that is physically and functionally the same as data link 27 between the corresponding local devices. As is the case with local devices, regional STPs and SCPs are provided in mated redundant pairs for purposes of reliability.

Both local and regional service control points 26 and 29 are connected via respective data links 35 and 36 to a service management system (SMS) 37. The service management system is also implemented by a large general purpose digital computer and interfaces to business offices in the local exchange carrier and inter-exchange carriers. The service management system downloads information to the data bases of the service control points 26 and 29 when subscribers modify their ensemble of AIN services. Similarly, the service management system downloads, on a non-real time basis, billing information that is needed in order to appropriately invoice telephone company subscribers for the services provided.

The AIN will also include (in the AIN 0.2 software release) service nodes (SNs) such as service node 39 shown in FIG. 1. The AIN 0.2 software release, which incorporates service nodes into the AIN, is known in the art and described in Bell Communications Research GR-1280-CORE "Advanced Intelligent Network (AIN) Service Control Point (SCP) Generic Requirements," Issue 1, August 1993; and Bell Communications Research GR-1298-CORE, "Advanced Intelligent Network (AIN) 0.2 Switching Systems Generic Requirements," Issue 1, November 1993. Those skilled in the art will be familiar with service nodes, which are physically implemented by the same types of computers that embody the service control points 26 and 29. In addition to the computing capability and data base maintenance features, service node 39 also includes voice and DTMF signal recognition devices and voice synthesis devices. Service node 39 is connected to the service management system 37 via a data link 40 that services the service node in essentially the same way it services SCPs 26 and 29. While service node 39 is physically quite similar to SCP 26, there are some important differences in the use to which it is put. Service control points such as SCP 26 normally implement high volume routing services such as call forwarding and 800 number translation and routing. They are also used for maintenance of and providing access to high volume data bases for authorization of billing, such as credit card number validations. In most local exchange carrier networks, service control points are only used for data base lookup and routing services that take place prior to the connection of the call.

By contrast, service nodes, such as service node 39, are used principally when some enhanced feature or service is needed that requires an audio connection to the call or transfer of a significant amount of data to a subscriber over a switch connection during or following a call. As shown in FIG. 1, service node 39 is typically connected to one or more switches via Integrated Service Digital Network (ISDN) links shown as 41. Thus, services that require real-time communication with a customer during a call usually employ the facility of a service node such as service node 39.

The foregoing description is a basic overview, together with a few examples, of the operation of the advanced intelligent network that is a modern public switch telephone system. In summary, the advanced intelligent network is a complex high speed, high traffic volume packet switched messaging arrangement that provides a great deal of versatility in handling of telephone calls. Most network elements, in particular the SSP switches, are designed so that a relatively simple format of a query message is generated upon certain events and the switch will wait for a response from the network before proceeding with call processing. These procedures employ a watchdog timer that will time-out in the event a response to a query is not received.

The present invention relates to a unique feature which is implemented using the AIN to provide a recorded message to a caller who has attempted to call a number which is already busy. The call is later completed when the called line becomes idle. In the past, if a telephone subscriber's line was busy, the network returned an audible busy signal to the caller and terminated further processing of the call. The caller would then have to continue to redial the called number until a call could be completed. Many people may never call back if a busy signal is initially encountered. This could be damaging to a small business that relies upon telephone service as a primary source for its business. Telephone subscribers were not able to hold calls while their telephone lines were in use without the purchase of o additional phone lines or trunk capacity. A disadvantage of using additional phone lines is that calls are completed and then placed on hold.

Some subscribers, predominantly business telephone subscribers, use Automatic Call Distributors (ACD), which are known in the art, to accommodate incoming calls. ACD systems incorporate added trunk capacity for a given number so that multiple calls can be completed to a number without encountering a busy signal. Each call completed to a subscriber using an ACD system can then be placed on hold, if necessary, after completion o to the called party. Many telephone subscribers use ACD equipment to hold calls until the called party is able to talk to the caller. One of the most common users of ACD equipment with phone systems is airline companies. In operation, when calling to make a flight reservation, many callers are informed by a recorded message that an operator will speak to the caller in the order in which the call was received. It is also typical that a recorded message, such as an advertisement or announcement, is played during the time that a caller is waiting to speak to an operator, in the example above to make an airline flight reservation. Although these systems are helpful in providing for connection of calls even during a period of heavy caller traffic, purchasing ACD equipment and adding extra phone lines for a smaller business can be prohibitively expensive and, therefore, not a viable alternative to having its customers encounter busy signals.

As discussed above, use of added phone lines or of ACD or PBX equipment completes the phone call via a chosen trunk line despite the fact that no person will be able to immediately speak with the caller if they are already occupied on another call. This causes inefficient use of trunk lines of the Public Switched Telephone Network (PSTN) during the period that a caller is on hold.

In addition to the added cost of purchasing ACD or PBX equipment or implementing additional phone lines, there is also the problem of system inefficiency. Many business or residential telephone subscribers have peak periods when they receive more calls than in other periods. It is inefficient to have to purchase extra phone lines to accommodate these peak periods when the additional lines are not required outside of those peak periods. For example, a business that sells products through mail may have a peak period immediately following an advertisement for its goods on a television program. This mail order business would have to accommodate its entire system around these peak periods while during the majority of its operating hours, much of its phone line capacity remained unused.

It is also difficult to prioritize the order of responding to incoming calls other than to take the calls in the order in which they were received. In the past, prioritizing certain calls over others has been accomplished by providing separate subscriber numbers and separate trunk rotation sequences. Therefore, without this separate line and rotation, an important customer or call may be placed on hold while other lesser important calls occupy a called party.

Furthermore, local exchange carriers cannot charge a fee or collect any revenue for processing a call that results in a busy condition for which answer supervision is not returned. Therefore, potential revenue is being lost by each local exchange carrier when a called number is busy. Alleviation of the busy condition for callers, even if the call is not completed to the called number immediately, would mean additional revenue to each local exchange carrier. There has been no opportunity in the past to provide a revenue generating enhanced service on a call to a busy line except for call waiting.

Therefore, there is a need for a method of implementing the AIN to allow a called party to place calls in a hold condition without the use of additional phone lines or the purchase of ACD or PBX equipment, to play a recorded message to callers when the called line is occupied and to complete calls placed on hold based upon a priority system established by the called party.

SUMMARY OF THE INVENTION

The present invention is a method for placing a call to a busy line on hold using local exchange carrier network facilities and providing a recorded message to the caller. The call is subsequently completed when the busy line becomes idle. The invention uses the AIN to implement this process. Broadly stated, the present invention provides a method of using the AIN to allow a called party to place calls on hold without the need for additional phone lines by the called party and to play a recorded message to the calling party while placed on hold. The process of the present invention further provides for a priority system to be established by the called party such that some calls are completed prior to others irrespective of their order of occurrence. The process of the present invention also provides for the ability to play a plurality of different messages depending upon the calling number.

With the process of the present invention, a call initiated to a called number that is busy is placed into a queue in a service control point without completing the call. After being assigned to the queue in the service control point, the call is connected to a service node via a chosen voice circuit and a recorded message is played to the calling party from the service node. Simultaneous with the playing of the recorded message, the called line is monitored and an "idle status" response is indicated when the called line becomes idle. Thereafter, one of the queued calls is connected to the called number. The process also provides for prioritizing all calls which are queued based upon a prioritization system relating to the calling phone number. Information regarding the priority system is stored in a data base located in the service control point.

More particularly, the process of the present invention initially detects a call attempting to reach a busy called number and sends a message to a service control point in the AIN. The service control point, based upon information contained in its data base, queues the call and then directs the call to an intelligent peripheral, preferably a service node. A recorded message is then played by the service node to the calling party. While the recorded message is being played, the SSP continually monitors the busy called number and, when the called line becomes idle, sends a message indicating the idle status to the service control point. The service control point, based upon information contained in its data base, selects the next call to be completed and then sends a signal to the intelligent peripheral to cancel the recorded message being played to the next call to be completed. That chosen call is then connected to the called party's line.

Still more particularly, the process of the present invention provides a busy line trigger in response to the dialing of a call from a calling party to a called party. The busy line trigger is provided from a first service switching point to the service control point in response to the detection of a busy condition on the called line. The service control point then sends a Send-to-Resource message to the service node in response to the busy line trigger message, which specifies a particular audio message to be played by the service node to the calling party. In order to play this recorded message, a voice circuit between the calling party and the service node is established. The first service switching point monitors the status of the called party line and sends a number idle status message to the service control point in response to removal of the busy condition from the called line. The service control point then selects a call which is currently connected to the service node, based upon indicia selected by the called party and stored in its data base queue, and disconnects the voice circuit of the calling party line from the service node. Thereafter, a voice circuit is established between the calling and called parties and the call is connected.

The preferred service control point includes a data base associated with the called number identifying at least a subset of potential calling numbers as priority subscriber numbers. If a priority subscriber number is in the queue kept by the service control point when the called line becomes idle, that call is connected prior to others not designated as priority numbers which are in the queue.

Therefore, it is an object of the present invention to provide a method which allows a called party to place calls on hold without the use of additional phone lines or the purchase of ACD or PBX equipment.

It is also an object of the present invention to play a recorded message to calling parties placed on hold when the called line is busy and to complete calls placed on hold based upon a priority system established by the called party.

It is a further object of the invention for allowing local exchange carriers to obtain revenue for processing calls which initially result in a busy condition.

It is a further object of the invention to play selected recorded messages to the calling party based upon the calling number or the called number or a combination of both the calling and called numbers.

That the present invention meets these objects will be appreciated from the following description of various embodiments of the present invention.

BRIEF DESCRIPTION OF THE DRAWINGS

FIG. 3 is a block diagram of a section of the Advanced Intelligent Network as shown in FIG. 1.

FIG. 4 is a flow diagram showing the process of the present invention.

DETAILED DESCRIPTION

Figure 1:
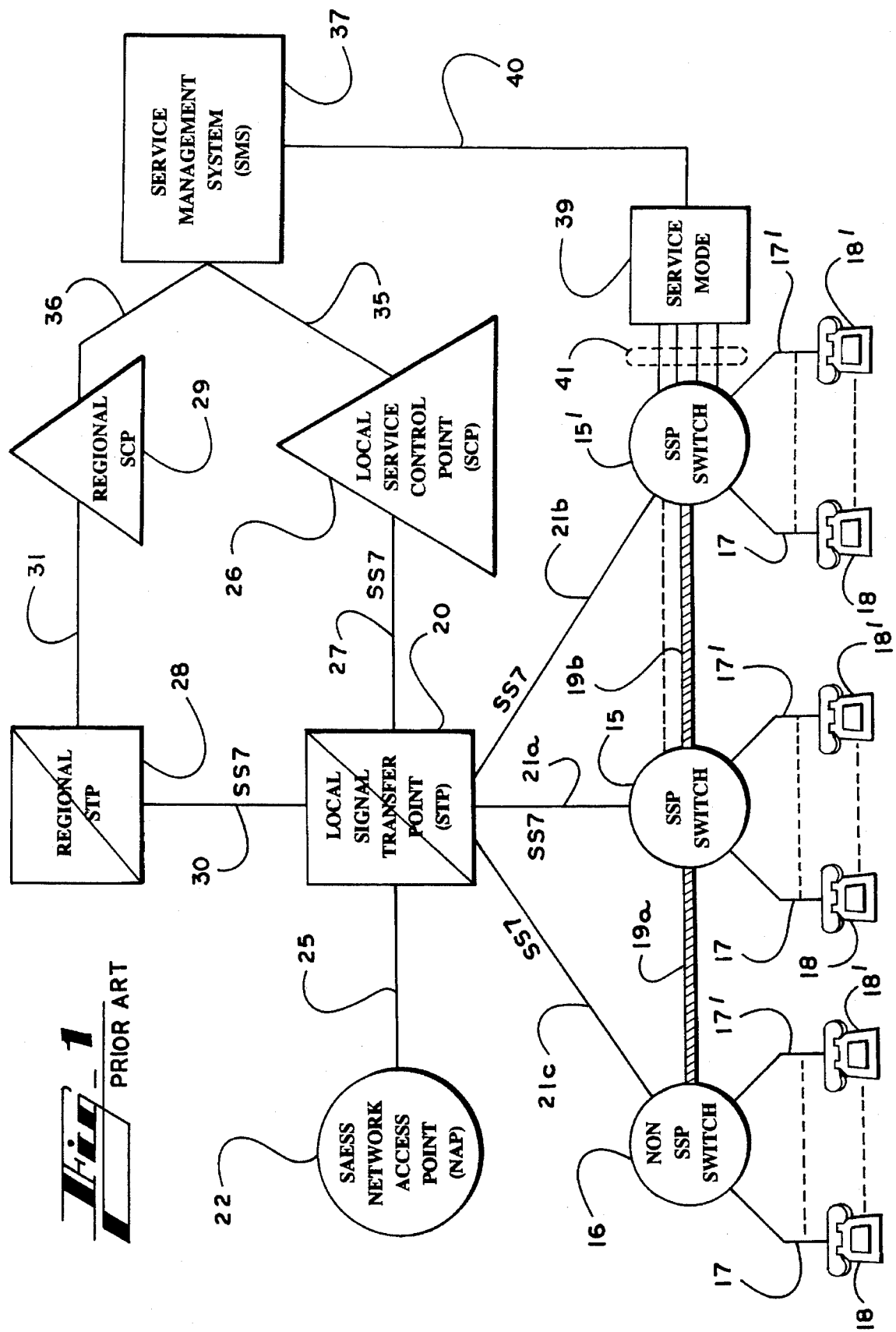
FIG. 1 is a block diagram of the Advanced Intelligent Network in a typical switched telephone system.

Turning now to the drawing figures in which like numbers reference like parts or steps, the preferred embodiment of the present invention will now be described. The existing Advanced Intelligent Network (AIN) in a typical switched telephone system is shown in FIG. 1 and has been described in the Background of the Invention section of this specification. The present invention involves a unique process using the AIN to provide a service not otherwise available to telephone subscribers. This service uses the AIN to allow a called party to place a call on hold while the called line is busy. While on hold, a recorded message of the called party's choice is played to the calling party. The call between the parties is completed after the called line becomes idle. While the operation of this process is described for one called line, it should be understood that the process can also be implemented when more than one line is used by a particular "Advertise-on-Busy" subscriber. The preferred embodiment of the present invention also provides for prioritizing all calls on hold for a given called number. Therefore, using the process of the present invention, it is possible for the called party to receive calls in an order of importance as chosen by that called party.

Figure 2A:
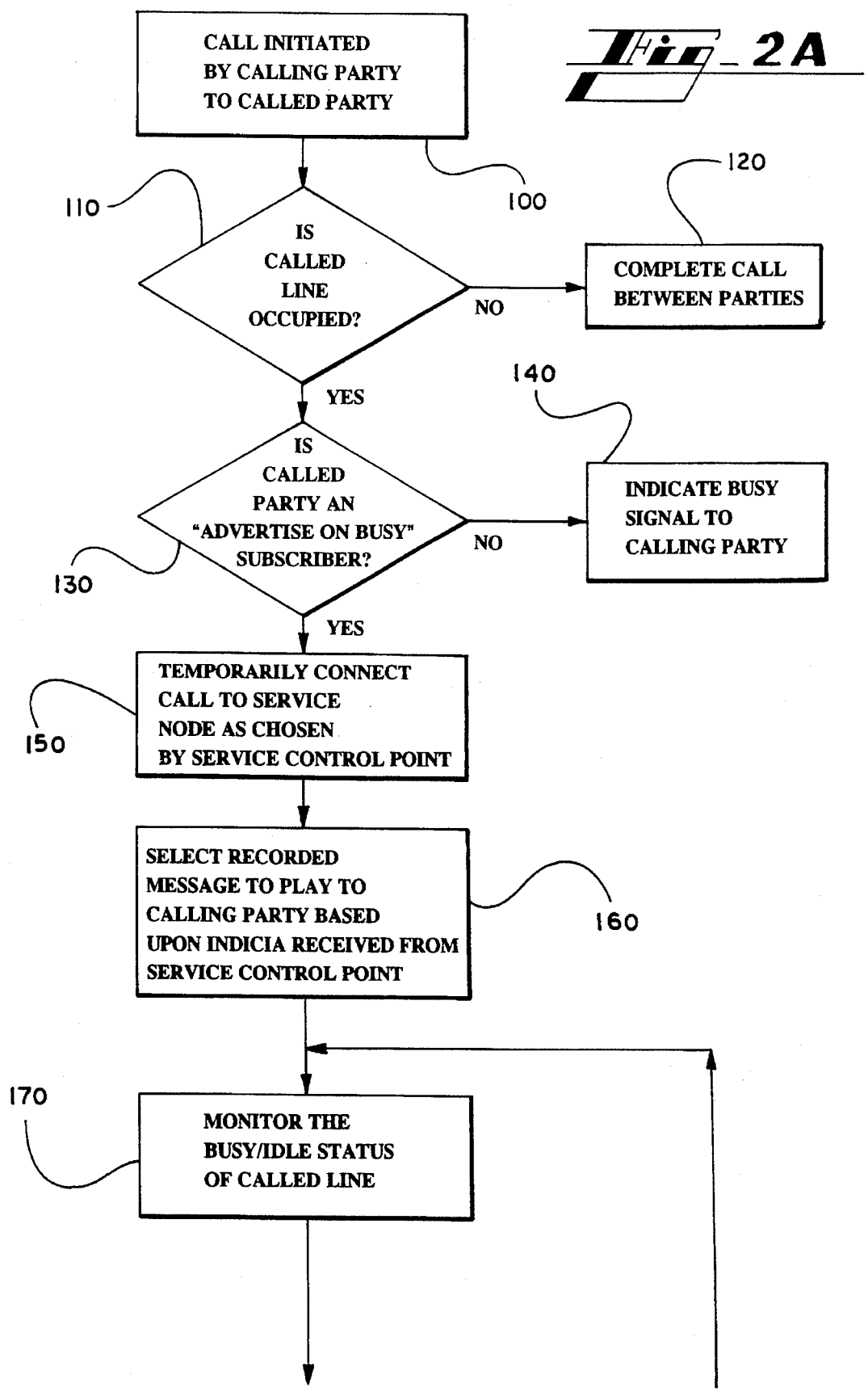
FIG. 2 is a flow diagram showing an overview of the process of the present invention.
Figure 2B:
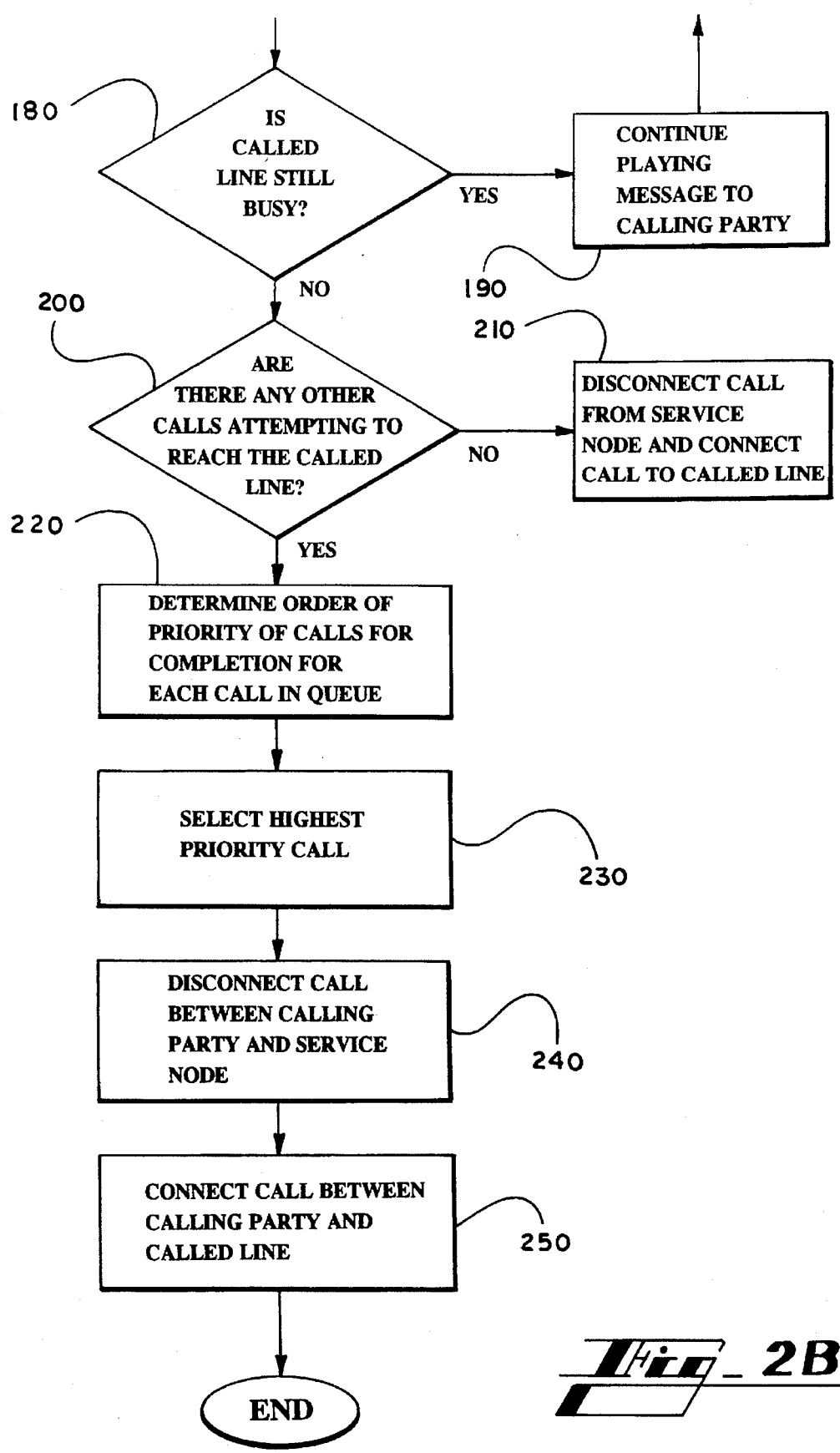

FIG. 2 is a flow chart which shows a basic overview of the process of the present invention. Initially, a call is initiated as shown in block 100. It is then determined whether the line for the called number is busy (block 110, FIG. 2). If the called number is not busy, the telephone network, using the AIN, connects the call to the called line (block 120, FIG. 2). If the called party is busy, the system determines if the called number subscriber is an "Advertise-on-Busy" subscriber (block 130, FIG. 2). If the called party is not an "Advertise-on-Busy" subscriber, then the telephone system initiates a busy signal to the calling party indicating that the called line is busy or occupied (block 140, FIG. 2). On the other hand, if it is determined by the telephone system that the called line, which is busy, is an "Advertise-on-Busy" subscriber, then the call is queued in a service control point 26 and then temporarily connected by a voice circuit to a chosen service node 39. The service node then plays a recorded message selected by the service control point to the caller while waiting to provide a connection to the called line (blocks 150 and 160, FIG. 2). The queue established in this service control point 26 establishes the order that calls placed on hold will be connected to the called line. The service control point 26 also stores indicia related to the message to be played in the service node 39 for any given call. These recorded messages can be chosen, selected, and created by the "Advertise-on-Busy" subscriber. The messages may be changed or periodically updated as needed. For instance, the recorded message could be simply an advertisement for a business which the caller is attempting to reach. As another example, the message may also be instructions to the caller which would help decrease the total call time once the caller is connected to the called line. It is also possible for an "Advertise-on-Busy" subscriber to create and have stored more than one message. With this feature, different recorded messages can be played based upon the calling number. This allows the messages to be customized for certain groups of callers. For instance, using one process of the present invention, it would be possible for a business to play one message to its established customers and another message to its established suppliers while those particular calls were on hold.

Simultaneous to the message being played to the calling party, the called line is monitored to determine when it becomes idle (blocks 170, 180, and 190, FIG. 2). The SCP 26 initiates the monitoring by sending a monitor-for-change message to the SSP 15 that handles the called number. When the called line becomes idle, the SSP 15 sends an idle status indication to the SCP 26 to indicate to the SCP 26 that the called number is available for a call from the queue. When this monitor indicates that the called line is idle, it is determined whether there is more than one call which is currently holding in a hold queue in the SCP 26 waiting for connection (block 200, FIG. 2). If there is only one call holding in the SCP 26 to be connected, then that call is then connected to the called line (block 210, FIG. 2). If more than one call to the called line has been queued in the SCP 26 to await connection, then any difference in priorities for the queued calls must be determined (block 220, FIG. 2). This priority determination is based upon a selection criteria established by the subscriber and stored in a data base in the service control point 26 which corresponds to the called number. With this priority determination criteria, the "Advertise-on-Busy" subscriber can receive calls which it deems as more important prior to any other calls (block 230, FIG. 2). If the user has not selected a specific priority criteria, then the system would default to connecting the call which had been in the SCP 26 queue for the longest period of time. If there is at least one call remaining in the queue after a call has been completed, another monitor-for-change message is sent to the SSP 15 to reinitiate the monitoring process. Although the flow chart of FIG. 2 shows the overall process of the present invention, FIGS. 3 and 4 show in detail the operation in which the AIN implements the process of the present invention.

FIG. 3 shows a block diagram of a section of the AIN architecture as described above with respect to FIG. 1. The basic architecture of the AIN is known in the art. The AIN devices shown in FIG. 3 are the apparatus that performs the steps of process of the preferred embodiment of the present invention. Initially, after a call encounters a busy line where the called party is a subscriber to the "Advertise-on-Busy" service, a busy line trigger on the called number is used to send a query to the "Advertise-on-Busy" service requesting instructions as to how to handle the call. The "Advertise-on-Busy" service parameters can be stored data in either a service control point (SCP) 26 or another intelligent peripheral such as a service node 39. Preferably, the service parameters are located in an SCP 26. This connection from the SSP switch 15 is typically completed to an SCP 26 through a signal transfer point 20 using a SS7 link 21a.

Upon receipt of a query, the SCP 26 initiates and sends a Send-to-Resource message to an intelligent peripheral, preferably a service node 39. The Send-to-Resource message is used to temporarily connect the call to a chosen service node 39 where the call is then queued. The call is connected to the service node 39 via a chosen trunk 19 between a SSP switch 15 and a SSP switch 15' and between a SSP switch 15' and Integrated Service Digital Network (ISDN) links shown as 41. In temporarily connecting the call, the SSP switch 15 establishes a voice and data circuit over trunk 19 and ISDN links 41 with the service node 39 and passes an SS7 packet to the SSP switch 15' which converts it to an appropriate ISDN format and passes it to the service node 39. The recorded message is played to the calling party from the service node 39 via a digitized voice channel on the ISDN.

After the call has been queued in the SCP 26, a recorded message selected by the SCP is played in the service node 39. The SCP 26 transmits the data packet to the service node 39 containing indicia of the specific recorded message to be played. The recorded message is initially chosen and approved by the "Advertise-on-Busy" subscriber. It is clearly within the state of the art to construct embodiments of the present invention for which the advertiser may remotely create and change its advertising messages at the service nodes. The message may be created directly over the telephone line with a compressed digitized version being stored in the service node. Alternately, the message may be created and digitized off-line and a digitized compressed form of the message (in appropriate format) may be transmitted via modem or ISDN data link to the service node. In any event, the recorded messages can be changed by the subscriber as needed. The service node 39 is able to access and play several different messages depending upon certain parameters as defined by the SCP 26. For instance, it is possible for the service node to play different recorded messages to different calling subscribers. These parameters are established by the subscriber and are contained in a data base in the SCP.

Immediately after the call has been queued, and simultaneous with the playing of a recorded message, a Monitor-for-Change message is sent by the controlling SCP to the SSP that handles the busy subscriber's line if there are currently no other calls in the queue. If other calls are already in the queue, then the monitor-for-change message has already been sent. This message causes the SSP to monitor the busy/idle status of the called line. When the called line becomes idle, a Monitor-Success message is sent to the SCP 16 indicating that the called line is now idle. The SCP will then select one of the queued calls (if there is more than one) to be connected to the called line. The selection of which queued calls get connected before others can be made in a number of different ways. It is possible to provide a customized queuing hierarchy for each subscriber. This feature provides that a subscriber can receive calls from the SCP queue in the order that the subscriber chooses. If a subscriber has no predetermined order in which it would like to receive calls which are being played a recorded message, then the SCP connects the calls in the queue on a first-in-first-out basis.

After the SCP 216 has chosen which call will be connected, it will send a Cancel-Resource-Event message to the service node 39. This message causes the service node to release the desired queued call and the service control point then connects it to the initial called line. If any calls remain in the queue, another Monitor-for-Change message is sent by the SCP 216 for the busy subscriber's line. It should also be noted that, at any point during the process described above, the calling party can disconnect (hang-up). If a calling party does disconnect, this action is detected by the service node 39 and reported to the SCP with a Resource-Clear command. The parameters and algorithms relating to the message to be played are contained in a data base in the SCP 216.

FIG. 4 is a flow chart which sets forth and defines more particularly the process of the present invention as implemented by the system shown in FIGS. 1 and 3 above. In response to the call initiated by the calling party, a busy line trigger from an SSP switch 15 is sent through STP 20 to SCP 26. When the SCP 26 receives the busy-line trigger message, it sends a Send-to-Resource message to the service node 39 (blocks 270, 290, FIG. 4). The Send-to-Resource message specifies a particular message from a plurality of audio messages that are associated with the called and calling number (block 290, FIG. 4). The SCP stores all indicia of the call for each calling party that is currently in a queue for a given called number in the SCP 26 (block 280, FIG. 4). A voice circuit is then established between the calling number and the service node 39 so that the chosen audio message can be played to the calling party by the service node 39 (block 310, FIG. 4).

At the same time that the message is being played by the service node 39, the SSP 15 associated with the called number monitors the status of the called line, by sending a Monitor-for-Change message from the SCP 26 to the SSP for the busy subscriber's line, and sends a number idle status message to the SCP when the line becomes idle (block 320, FIG. 4). Each call made to the called number during a period when the line is busy is handled as described above with respect to FIG. 4. Thereafter, the SCP 26 responds to the idle status message and selects a queued call from its queue memory (blocks 350 and 360, FIG. 4). The SCP then disconnects the voice circuit between the calling party and the service node 39 for the call selected from its queue memory and establishes another voice circuit between that call with the called number (blocks 370 and 380, FIG. 4). If other calls remain in the queue, another Monitor-for-Change message is sent by the SCP 26 for the busy subscriber's line (blocks 390, 400, FIG. 4).

As discussed above, it is possible for the "Advertising-on-Busy" subscriber to prioritize the order of the calls to be received from the queued calls in the service node. In establishing a priority system, the SCP 26 is provided with a data base which is associated with the "Advertise-on-Busy" subscriber's number. At least one potential calling number is stored in the data base, and is thereby designated as a priority number. In operation, the amount of telephone numbers which can be designated as priority numbers is limited only by the size of the data base associated with the SCP. When this prioritization system has been implemented, the SCP responds to the idle status message by determining whether any queued calls correspond to a priority number in the data base.

If there is a priority call number which corresponds to one of the calls which is queued, that particular call is connected before any others that have been queued. In the preferred embodiment, if more than one call which is queued has been identified as a priority number, then the first call in time will be the selected call to be connected. However, it is possible, by use of selection criteria which are known in the art, to establish different levels of priority in the data base. Therefore, some numbers which are listed in the data base as priority numbers may not be connected to the called number before later queued calls that have a greater level of priority.

In the same manner as the prioritization system described above, the data base associated with the SCP 26 may also contain indicia that determines which one from a plurality of messages will be played to the caller. This indicia is forwarded with the Send-to-Resource message which is forwarded from the SCP to the service node prior to playing the recorded message.

From the foregoing description, it will be appreciated that the various embodiments of the present invention meet the objects stated above for providing a recorded message when a busy signal is encountered. It addresses the problems and potential problems described in the Background of the Invention. From the foregoing description of alternate embodiments of the present invention, other embodiments will suggest themselves to those skilled in the art. Therefore, the present invention should be limited only by the claims below and equivalents thereof.

We claim:

1. In an advanced intelligent network, a system including a first service switching point, a second service switching point and a service node to process a telephone call directed to a telephone number associated with a subscriber's line when the telephone number is busy, comprising:

the first service switching point serving the subscriber's line, and operative to make a direct voice-circuit connection between the first service switching point and the subscriber's line;

the first service switching point also being operative to receive on a caller's line the telephone call directed to the subscriber's line, and the first service switching point being further operative to determine whether the subscriber's line is busy;

in response to determining that the subscriber's line is busy, the first service switching point being further operative to temporarily connect the telephone call to a service node by connecting a first voice-circuit between the first service switching point and the second service switching point and by connecting a second voice-circuit between the second service switching point and the service node;

the service node being operative to place the telephone call in a queue and to play a message on the caller's line;

the first service switching point then being further operative to monitor the status of the subscriber's line to determine whether the subscriber's line becomes idle, and in response to determining that the subscriber's line has become idle, the first service switching point being further operative to disconnect the first voice-circuit between the first service switching point and the second service switching point, and to disconnect the second voice-circuit between the second service switching point and the service node, and to directly connect the telephone call to the subscriber's line by making a direct voice-circuit connection between the first service switching point and the subscriber's line.

2. In an advanced intelligent network including a first service switching point a second service point and a service node, a method of processing a telephone call directed to a telephone number associated with a subscriber's line when the telephone number is busy, comprising the steps of:

(a) receiving the telephone call on a caller's line at the first service switching point, the first service switching point serving the subscriber's line and operative to make a direct voice-circuit connection between the first service switching point and the subscriber's line;

(b) determining whether the subscriber's line is busy;

(c) in response to determining that the subscriber's line is busy, temporarily connecting the telephone call to the service node by connecting a first voice-circuit between the first service switching point and the second service switching point, and by connecting a second voice-circuit between the second service switching point and the service node;

(d) while the telephone call is temporarily connected to the service node,
   (i) placing the telephone call in a queue,
   (ii) playing a message on the caller's line, and
   (iii) monitoring the status of the subscriber's line to determine whether the subscriber's line becomes idle; and (e) in response to determining that the subscriber's line has become idle,
   (i) disconnecting the first voice-circuit between the first service switching point and the second service switching point and disconnecting the second voice-circuit between the second service switching point and the service node, and
   (ii) directly connecting the telephone call to the subscriber's line by making a direct voice-circuit between the first service switching point and the subscriber's line.

3. The method of claim 2, wherein the step of playing the message on the caller's line comprises the steps of:

determining a directory number associated with the subscriber's line; and selecting the message to be played on the caller's line based on the directory number.

4. The method of claim 2, wherein the step of playing the message on the caller's line comprises the steps of:

determining a directory number associated with the caller's line; and selecting the message to be played on the caller's line based on the directory number.

5. The method of claim 2, wherein the step of playing the message on the caller's line comprises the steps of:

determining a first directory number associated with the subscriber's line;

determining a second directory number associated with the caller's line; and selecting the message to be played on the caller's line based on the first directory number and the second directory number.

6. In an advanced intelligent network including a first service switching point a second service switching point and a service node, a method or processing a telephone call directed to a telephone number associated with a subscriber's line when the telephone number is busy, comprising me steps of:

(a) receiving a telephone call directed to the subscriber's line on a caller's line at the first service switching point, the first service switching point serving the subscriber's line and operative to make a direct voice-circuit connection before the first service switching point and the subscriber's line;

(b) determining whether the subscriber's line is busy;

(c) in response to determining that the subscriber's line is busy, temporarily connecting the telephone call to the service node by connecting a first; voice-circuit between the first service switching point and the second service switching point, and connecting a second voice-circuit between the second service switching point and the service node;

(d) while the telephone call is temporarily connected to the service node,
   (i) placing the telephone call in a queue,
   (ii) playing a message on the caller's line, and
   (iii) monitoring the status of the subscriber's line to determine whether the subscriber's line becomes idle;

(e) repeating steps (a) through (d) above for each new telephone call directed to the subscriber's line that encounters the busy condition so as to provide a plurality of queued telephone calls in the queue; and (f) in response to determining that the subscriber's line has become idle,
   (i) selecting a telephone call from the plurality of queued telephone calls to be a selected call for connection with the subscriber's line,
   (ii) disconnecting the first voice-circuit between the first service switching point and the second service switching point, and disconnecting the second voice-circuit between the second service switching point and the service node for the selected call, and
   (iii) connecting the selected telephone call to the subscriber's line by establishing a voice-circuit between the first service switching point and the subscriber's line.

7. The method of claim 6, wherein the step of selecting the telephone call from the plurality of queued telephone calls to be a selected call for connection with the subscriber's line further comprises the steps of:

determining whether any of the plurality of queued telephone calls has a calling line number with a correspondence to one of a plurality of priority calling line numbers specified by the subscriber; and in response to finding any queued telephone call having the correspondence, then selecting one of the queued calls having the correspondence as the selected call.

8. The method of claim 7, wherein the step of then selecting one of the queued calls having the correspondence as the selected call further comprises the steps of:

determining which one of the plurality of queued telephone calls was the first queued call; and selecting the first queued call as the selected call.

* * * * *